United States Patent [19]

van der Lely et al.

[11] 4,050,520
[45] * Sept. 27, 1977

[54] CULTIVATOR WITH SCREENING DEVICE

[75] Inventors: Ary van der Lely, Maasland; Cornelis Johannes Gerardus Bom, Rozenburg, both of Netherlands

[73] Assignee: C. van der Lely N. V., Maasland, Netherlands

[*] Notice: The portion of the term of this patent subsequent to Nov. 27, 1990, has been disclaimed.

[21] Appl. No.: 652,098

[22] Filed: Jan. 26, 1976

Related U.S. Application Data

[63] Continuation of Ser. No. 208,687, Dec. 16, 1971, abandoned.

[30] Foreign Application Priority Data

Dec. 21, 1970  Netherlands ............... 7018555

[51] Int. Cl.$^2$ ........................... A01B 33/06
[52] U.S. Cl. ......................... 172/59; 172/112
[58] Field of Search ............... 172/39, 81, 112, 508, 172/510, 512, 59

[56] References Cited

U.S. PATENT DOCUMENTS

| | | | |
|---|---|---|---|
| 2,582,364 | 1/1952 | Tice | 172/112 X |
| 2,599,883 | 6/1952 | Aske | 172/112 X |
| 3,066,743 | 12/1962 | Hines | 172/81 |
| 3,542,133 | 11/1970 | Lely | 172/112 X |
| 3,557,879 | 1/1971 | Lely | 172/112 X |
| 3,661,213 | 5/1972 | Taylor | 172/112 X |

FOREIGN PATENT DOCUMENTS 6,807,548  12/1969  Netherlands ............... 172/59

*Primary Examiner*—Edgar S. Burr
*Assistant Examiner*—Paul T. Sewell
*Attorney, Agent, or Firm*—Mason, Mason & Albright

[57] ABSTRACT

A cultivator having rotatable soil-working tines on supports has a screening element pivotally connected to the front of the frame to extend downwardly near the supports. Springs bias the screening element to a position adjacent the tines to prevent damage by stones encountered during operation. Adjustment members permit the vertical adjustment of the screening element relative to the tines.

15 Claims, 7 Drawing Figures

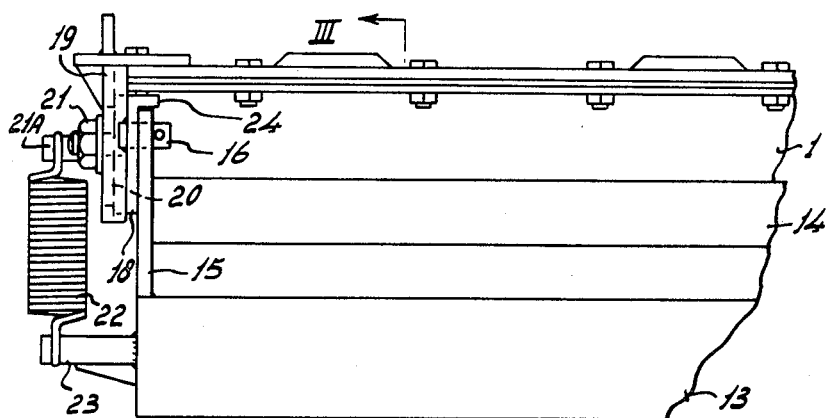
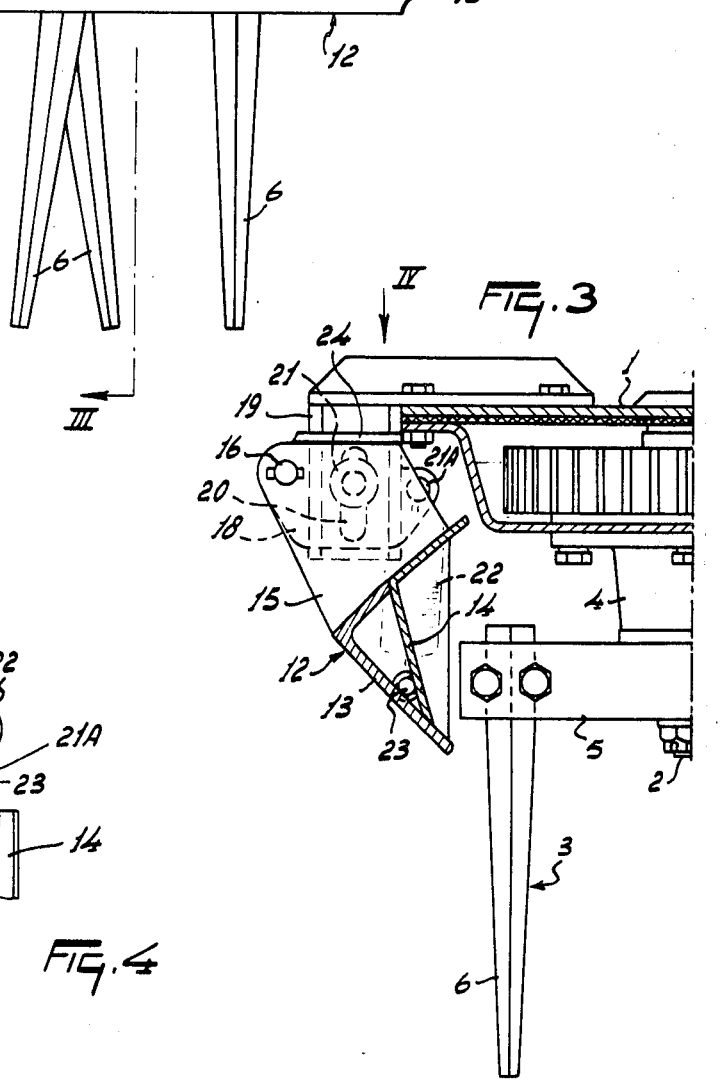
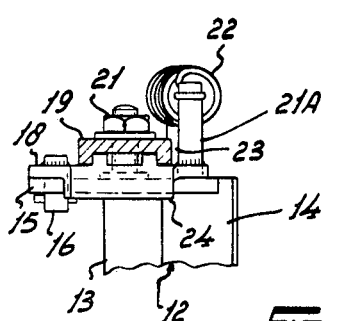

CULTIVATOR WITH SCREENING DEVICE

This application is a continuation of Ser. No. 208,687 filed Dec. 16, 1971, now abandoned.

Known cultivators of this kind are very liable to have their frames and the supports of their tines badly damaged by stones displaced from the soil because the soil working members normally rotate quite rapidly when the cultivator is in use. It is, accordingly, an object of this invention to provide a cultivator in which this danger is greatly reduced as compared with known cultivators of the same general kind.

According to the invention, there is provided a cultivator of the kind set forth, wherein a screening element is provided in front of the soil working members with respect to the intended direction of operative travel of the cultivator, the lower extremity of the screening element being located at a horizontal level which is not higher than the level of supports of the tines of said soil working members.

Figure 1:
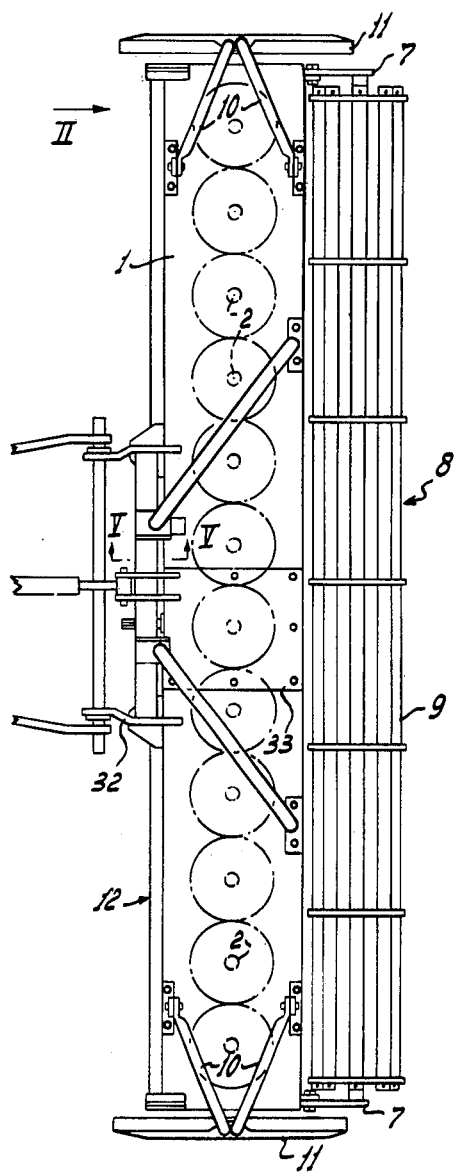
Figure 7:
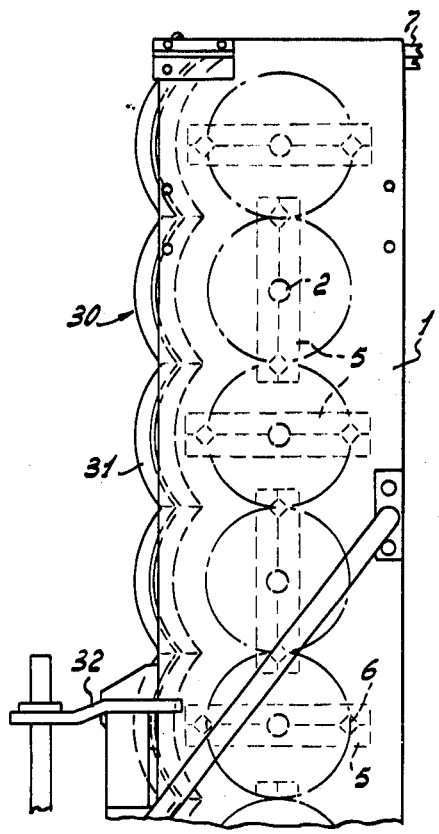
Figure 5:
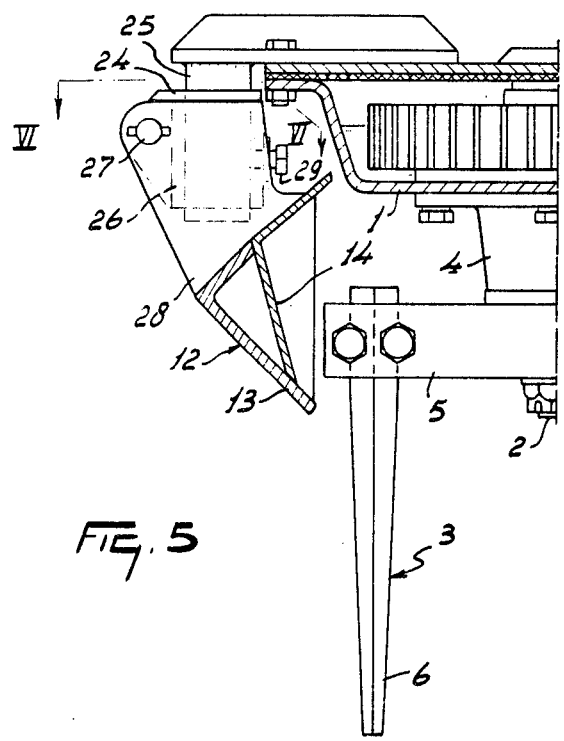
Figure 6:
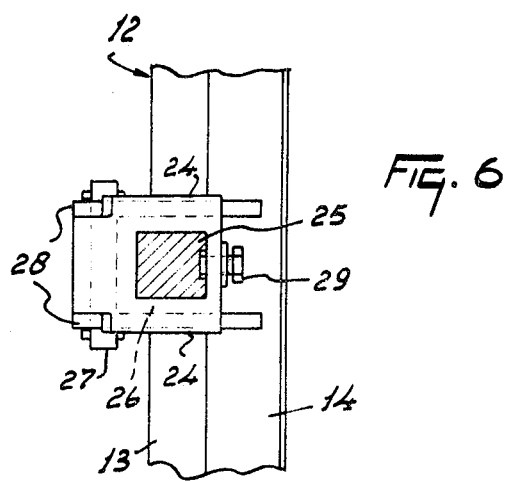

For a better understanding of the invention, and to show how the same may be carried into effect, reference will now be made, by way of example, to the accompanying drawings, in which:

FIG. 1 is a plan view of a soil cultivating implement or cultivator in accordance with the invention, FIG. 2 is a partial front elevation, to an enlarged scale, as seen in the direction indicated by an arrow II in FIG. 1, FIG. 3 is a section taken on the line III—III of FIG. 2, FIG. 4 is a plan view as seen in the direction indicated by an arrow IV in FIG. 3, FIG. 5 is a section, to an enlarged scale, taken on the line V—V of FIG. 1, FIG. 6 is a section taken on the line VI—VI in FIG. 5, and FIG. 7 is a plan view, to an enlarged scale, showing an alternative construction of certain parts of the cultivating implement or cultivator.

Referring to FIGS. 1 to 6 of the drawings, the soil cultivating implement or cultivator that is illustrated has a frame that is afforded principally by a main frame beam 1 of hollow formation that extends substantially horizontally perpendicular to the intended direction of operative travel of the cultivator which is from right to left as seen in FIG. 1 of the drawings. The beam 1 supports rotary soil working members 3 that are arranged in a single straight row and of which there are a plurality, such as the preferred number of twelve that are illustrated in FIG. 1. Each soil working member 3 is rotatable about the axis of a corresponding upright shaft 2 which will normally be vertically, or substantially vertically, disposed. Each shaft 2 is rotatably journalled in a corresponding bearing 4 (FIG. 3) that is fastened to the bottom of the main frame beam 1 and a lower end region of each shaft 2 carries a corresponding tine support 5. Each tine support 5 has two tines 6 clamped to its opposite ends by bolts and each tine 6 has an upper fastening portion and a lower soil working portion. These two portions make an angular junction with one another and the tines are usually secured to their supports 5 in such a way that their lower soil working portions trail with respect to the intended directions of rotation of the corresponding soil working members 3 (see FIG. 2). However, there are conditions under which it is desirable for the soil working portions of the tines 6 to lead (i.e. be inclined forwardly) with respect to the intended directions of rotation and the tines can be re-arranged in such positions when required. Each tine 6 is of square or other angular cross-section and tapers progressively in a downward direction towards its lowermost free end or tip. The axes of rotation of the shafts 2 are preferably spaced apart from one another by perpendicular distances of substantially 25 centimeters and the perpendicular distance between the tips of the two tines 6 of each soil working member is preferably slightly in excess of this value so that the strips of ground worked by individual members 3 during the use of the cultivator overlap to produce a single broad strip of worked ground having a width of substantially 300 centimeters in the illustrated embodiment.

Arms 7 project rearwardly from the main frame beam 1 at the opposite lateral ends thereof and are turnable upwardly and downwardly with respect to that beam, means being provided to secure the arms 7 in chosen height settings relative to the beam 1. The rearmost ends of the arms 7 support a rotary soil compressing member in the form of a roller 8 that comprises a plurality of circumferential elongated elements 9 each of which extends substantially parallel to the central axis of rotation of the roller 8. Each element 9 is arranged so as to be movable with respect to the parts of the roller 8 by which it is supported and the elements 9 are readily detachable from the roller 8 preferably by the removal of transverse pins located at their ends, these pins being visible in outline in FIG. 1 of the drawings.

Shield plates 11 are arranged immediately beyond the opposite lateral ends of the main frame beam 1, each shield plate 11 normally being contained in a substantially vertical plane that extends parallel to the intended direction of operative travel of the cultivator. Pairs of arms 10 connect the two shield plates 11 to the top of the main frame beam 1 by way of substantially horizontal pivots that define axes extending substantially parallel to the intended direction of operative travel. The lowermost edges of the shield plates 11 are arranged to make sliding contact with the ground surface and said shield plates can move upwardly and downwardly to some extent to match undulations in the ground surface during the operation of the cultivator by turning about the pivotal connections of the arms 10 to the main frame beam 1. During inoperative transport of the cultivator, the two shield plates 11 can be turned upwardly through approximately 180° about the pivots that have just been mentioned to lie in inverted positions on top of the main frame beam 1.

The front of the main frame beam 1 is provided with a screening element 12 that is afforded principally by a rigid beam 13 of L-shaped cross-section. In cross-section (FIG. 3), the larger limb of the beam 13 extends downwardly and rearwardly from the junction between the two limbs thereof with respect to the intended direction of operative travel of the cultivator while the other smaller limb is inclined upwardly and rearwardly with respect to said direction. A cover plate 14 that is substantially vertically disposed extends between the two limbs of the beam 13 at the rear of that beam with respect to the intended direction of operative travel of the cultivator and serves to prevent stones from lodging between said limbs during the operation of the cultivator. The cover plate 14 has a rearwardly bent over upper portion and, as can be seen in FIG. 3 of the drawings, this portion is substantially coplanar with the smaller upper limb of the beam 13. Substantially vertical supports 15 are rigidly secured to the beam 13 at its opposite ends and these supports are turnably connected in substantially horizontal pivots 16 that are located in front of the screening element 12 with respect to the intended direction of operative travel of the cultivator. The pivots 16 about which the element 12 is turnable are themselves secured to supports 18 which are lodged in upright channel-shaped guides 19 secured to the opposite ends of the main frame beam 1. Each support 18 is formed with a vertically extending slot 20 and horizontal bolts 21 are passed through said slots and through circular holes in the guides 19 to allow the two supports 18 to be retained in different vertical settings with respect to the guides 19 throughout the distances dictated by the lengths of the slots 20. Clearly, the vertical setting which is chosen dictates the vertical level of the corresponding end of the screening element 12 with respect to the frame of the cultivator. Horizontal pins 21A project from the supports 18 at the rear of the latter with respect to the intended direction of operative travel and helical tension springs 22 extend substantially vertically between said pins 21A and further pins 23 that are fastened to the opposite ends of the screening element 12 in the lower angular junction between the larger limb of the beam 13 and the cover plate 14. The springs 22 are located behind the screening element 12 and normally urge the supports 15 into contact with stops 24 that are afforded by the horizontally bent over upper edges of the upwardly and downwardly slidable supports 18 (see FIGS. 2, 3 and 4). The springs 22 thus tend to maintain the screening element 12 in its normal operative position.

A vertical support 25 (FIGS. 5 and 6) of square cross-section projects downwardly in front of the main frame beam 1 at a location substantially midway along the length of the latter. The support 25 serves as a guide for a bracket 26 to which a double support 28 is turnably connected with the aid of a substantially horizontal pivot pin 27. The double support 28 is secured to the screening element 12 at substantially the midpoint of the length of the latter and the longitudinal axis of the pivot pin 27 is coincident with the axis afforded by the horizontal pivots 16. The bracket 26 will slide upwardly and downwardly along the square cross-section support 25 and a small locking bolt 29 is entered through the rear wall of the bracket 26 into a vertical groove in the support 25 and can be tightened to maintain any chosen vertical setting of the bracket 26 relative to the support 25.

With the mounting of the screening element 12 which has been described, few stones find their way between said element and the tine supports 5 even when working in very stoney ground. Any stone which does succeed in entering this region will not normally cause breakage because, upon such a stone jamming between one of the tine supports 5 and the screening element 12, said element will turn downwardly and forwardly about the axis defined by the pivots 16 and 27 against the action of the strong springs 22. When the stone has fallen or been pushed clear, the strong springs 22 immediately return the element 12 to its pre-adjusted opertive position. The lowermost edge of the screening element 12 is advantageously located beneath the lowermost edge of each tine support 5 by a vertical distance having a value of between 0 centimeters and 6 centimeters, a distance of 5 centimeters being preferred. The lowermost edge is preferably spaced only a very short distance from each tine 6 when that tine is in its foremost position with respect to the intended direction of operative travel of the cultivator and this distance (see FIG. 3 and 5) may advantageously be between 1 and 2 centimeters, preferably having a value of 1.5 centimeters.

FIG. 7 of the drawings illustrates an embodiment in which an alternative screening element 30 consists of a plurality of arcuately curved portions 31 arranged in neighbouring relationship with the center of curvature of each portion 31 substantially coinciding with the axis of rotation of the soil working member 3 that lies immediately behind it. This construction still further improves the resistance to damage by stones under certain working conditions and, apart from the formation of the screening element 30 as a plurality of curved portions, its pivotal mounting, upward and downward adjustability and general construction may be similar to that which has already been described in relation to the screening element 12.

In the use of the soil cultivating implement or cultivator which has been described, a trestle-shaped coupling member 32 at the front of the main frame beam 1 is pivotally connected to the three-point lifting device or hitch of an agricultural tractor or other operating vehicle in the manner which can be seen in outline in FIGS. 1 and 7 of the drawings and the forwardly projecting rotary input shaft of a gear box 33 mounted on top of the beam 1 is placed in driven connection with the power take-off shaft of the same tractor or other operating vehicle with the aid of an intermediate telescopic transmission shaft (not shown) of known construction having universal joints at its opposite ends. The soil working members 3 are rotated by drive derived from the gear box 33 in such a way that each member 3 revolves in the opposite direction to its neighbour or to both of its neighbours. Upon moving the cultivator over the ground from right to left as seen in FIG. 1 of the drawings with the tines 6 penetrating into that ground, the soil will be broken up to a large extent and the elongated elements 9 of the following roller 8 will crumble any remaining lumps of soil, clods of earth or the like that have not been adequately dealt with by the tines 6. The level of the axis of rotation of the roller 8 which is appointed by suitable upward or downward adjustment of the arms 7 effectively dictates the depth of penetration of the tines 6 into the ground so that the roller 8 serves this function in addition to tightly compressing the soil previously broken up by the immediately foregoing tines 6. The shield plates 11 occupy the operative positions shown in FIG. 1 of the drawings and serve to screen regions at the lateral sides of the cultivator from flying stones, mud and the like and prevent the building of ridges. The screening element 12 or 30 which is located at the front of the cultivator at substantially the same horizontal level as the tine supports 5 fends off the great majority of stones and very greatly reduces the damage which they cause to parts of the cultivator such as the tine supports 5 and the hollow frame beam 1. The inclined leading surfaces of the element 12 or 30 preferably make angles with the horizontal of not les than 30° and not more than 60° and an inclination of 45° is preferred for most cultivating operations. Adjustment of the height of the element 12 or 30 with respect to the levels of the tine supports 5 is effected by loosening the bolts 21 and 29 and moving the whole assembly upwardly or downwardly relative to the guides 19 and support 25 as may be required. Re-tightening the bolts 21 and 29 maintains the newly chosen setting. The particular angular disposition of the front of the screening element 12 or 30 ensures that the vast majority of stones and other similar hard objects that are displaced by the tines 6 pass downwardly beneath the cultivator. However, if a stone or the like does get jammed between the element 12 or 30 and the beam 1 or one of the tine supports 5, said element 12 or 30 is deflected to some extent against the action of the strong springs 22 and will turn automatically to its pre-set position immediately upon the removal of the offending stone or the like which for instance can be done with the aid of a suitable tool such as, for example, a strong screwdriver. The screening elements 12 and 30 extend throughout the whole of the working width of the cultivator as does the roller 8 and, when the tines 6 are set to penetrate deeply into the soil, for example on roughly ploughed ground, a lower portion of the element 12 or 30 will function as a smoothing member which immediately precedes the tines 6 over the ground.

Although various features of the soil cultivating implements or cultivators that have been described and/or illustrated in the accompanying drawings will be set forth in the following claims as inventive features, it is emphasised that the invention is not necessarily limited to those features and that it encompasses all of the features that have been described and/or illustrated both individually and in various combinations.

What we claim is:

1. A cultivator having an elongated frame and a plurality of rotatable soil working members arranged in a transverse row, said soil working members being rotatable about upwardly extending axes and comprising downwardly extending tines mounted on supports, said supports with tines being in driving connection and rotated by driving means, screening means pivotably connected to said frame and extending substantially horizontally along the front of said frame relative to the direction of travel, a lower portion of said screening means during operation being located directly in front and adjacent the connections of said tines to their respective supports in the foremost positions thereof, said screening means being turnably connected to said cultivator with substantially horizontal pivots, spring means interconnecting said screening means with said frame and biasing said screening means to an operative protective position, a front side of said screening means affording a surface that engages the soil during operation and includes a portion that extends downwardly and rearwardly protecting the front of said frame and the connections of said tines with their supports from debris in and on the soil that would be encountered by the rotating tines during operation.

2. A cultivator as claimed in claim 1, wherein adjustment means interconnects said frame with said screening means to permit vertical adjustments of the screening means relative to said tines and their connections with their respective supports.

3. A cultivator as claimed in claim 1, wherein said pivots are mounted on support members of said screening means and said pivots are located in front of said screening means with respect to the direction of travel.

4. A cultivator as claimed in claim 3, wherein said support members are slideable in vertical directions on guides and said guides are connected to said frame.

5. A cultivator as claimed in claim 4, wherein stops on said support members are secured to said frame and said screening means is urged into engagement with said stops by at least two tension springs of said spring means.

6. A cultivator as claimed in claim 1, wherein said screening means comprises a plurality of arcuately curved portions, one respective portion for each rotatable soil-working member, and the centers of curvature for said portions substantially coincide with the axes of rotation of the respective soilworking members.

7. A cultivator as claimed in claim 6, wherein said curved portions are positioned in adjacent, neighboring, relationship.

8. A cultivator having an elongated frame and a plurality of rotatable soil working members arranged in a transverse row, said soil working members being rotatable about upwardly extending axes and comprising downwardly extending tines mounted on supports, said supports with tines being in driving connection and rotated by driving means, screening means pivotably connected to said frame and extending substantially horizontally along the front of said frame relative to the direction of travel, said screening means being displaceable forwardly about pivot connections, a lower portion of said screening means during operation being located directly in front and adjacent the connections of said tines to their respective supports in the foremost positions thereof, said screening means having a lower portion that terminates substantially above the lowermost ends of said tines leaving the area between those ends and said lower portion unobstructed, spring means interconnecting said screening means with said frame and biasing said screening means about a horizontal axis to an operative protective position, a front side of said screening means affording a surface that engages the soil during operation and includes lower and upper adjoining portions, the lower portion extending downwardly and rearwardly with respect to the direction of travel from a junction with the upper portion and said upper portion, from said junction, extending upwardly and rearwardly, said screening means being positioned to protect the front of said frame and the connections of said tines with their supports from debris in and on the soil that would be encountered by the rotating tines during operation.

9. A cultivator having an elongated frame and a plurality of rotatable soil working members arranged in a transverse row, said soil working members being rotatable about upwardly extending axes and comprising downwardly extending tines mounted on supports, said supports with tines being in driving connection and rotated by driving means, screening means pivotably connected to said frame and extending substantially horizontally along the front of said frame relative to the direction of travel, a lower portion of said screening means being located directly in front and adjacent the connections of said tines to their respective supports in the foremost positions thereof during operation, said screening means being turnably connected to said cultivator with substantially horizontal pivots, spring means interconnecting said screening means with said frame and biasing said screening means to an operative protective position, said screening means comprising a screening element that is substantially L-shaped in cross-section with two connected limbs, the lower limb of said element extending downwardly and rearwardly with respect to the direction of travel from the junction between said two limbs and the upper limb extending upwardly and rearwardly from said junction.

10. A cultivator having an elongated frame and a plurality of rotatable soil working members arranged in a transverse row, said soil working members comprising supports with downwardly extending tines and said supports each being mounted on upwardly extending shafts, an elongated screening element pivotably connected to said frame and extending substantially horizontally along the front of the frame relative to the direction of travel, a lower portion of said screening element being located directly in front of said shafts and adjacent connections of said tines to their respective supports in the foremost positions thereof during operation, said screening element being connected to the said frame with substantially horizontal pivots and said element extending below said connections, spring means interconnecting said screening element with said frame to bias said element to an operative protective position, a front side of said screening element having a surface that engages the soil during operation and includes a portion that extends downwardly and rearwardly, said front side terminating adjacent the front of said frame and the connections of said tines with their supports to protect same from debris in and on the soil that would be encountered by the rotating tines during operation.

11. A cultivator having an elongated frame and a plurality of rotatable soil working members arranged in a transverse row, said soil working members comprising supports with downwardly extending tines and said supports each being mounted on upwardly extending shafts, an elongated screening element pivotably connected to said frame and extending substantially horizontally along the front of the frame relative to the direction of travel, a lower portion of said screening element being located directly in front of said shafts and adjacent connections of said tines to their respective supports in the foremost positions thereof during operation, said screening element being connected to the said frame with substantially horizontal pivots and said element extending below said connections and terminating substantially above lowermost ends of said tines, spring means interconnecting said screening element with said frame and biasing said element to an operative position, a front of the said screening element having a lower surface that engages the soil during operation and comprises a lower and an upper portion that join each other, said lower portion, from the junction with the upper portion, extending downwardly and rearwardly with respect to the direction of travel, said upper portion, fron said junction, extending upwardly and rearwardly, said screening element being positioned to fend off debris and protect the front of said frame as well as the connections of said tines with their supports during operation.

12. A cultivator having an elongated frame and a plurality of rotatable soil working members arranged in a transverse row, said soil working members being rotatable about upwardly extending axes and comprising downwardly extending tines mounted on supports, said supports with tines being in driving connection and rotated by driving means, screening means displaceably connected to said cultivator and extending substantially horizontally along the front of said frame relative to the direction of travel, a lower portion of said screening means being positioned directly in front of the connections of said tines to their respective supports during operation, said screening means being linked to said cultivator frame and said screening means comprising an elongated element that is displaceable forwardly relative to said frame, a lower edge of said element being located immediately adjacent the connection of said tines with their respective supports during operation, a front side of said screening element being positioned to engage the upper surface of the soil during operation and that side including a portion that extends downwardly and rearwardly, said screening element being positioned to be moved through the soil and protect the front of said frame as well as the connections of said tines with their supports by fending off debris in and on the soil that would be encountered by the cultivator during operation.

13. A cultivator having an elongated frame and a plurality of rotatable soil working members arranged in a transverse row, said soil working members being rotatable about upwardly extending axes and comprising downwardly extending tines mounted on supports, said supports with tines being in driving connection and rotated by driving means, screening means displaceably connected to said cultivator and extending substantially horizontally along the front of said frame relative to the direction of travel, a lower portion of said screening means being positioned directly in front of the connections of said tines to their respective supports during operation, said screening means being linked to said cultivator frame and said screening means comprising an elongated element that is displaceable only in a forward direction with respect to said frame, a lower edge of said element being located immediately adjacent the connection of said tines with their respective supports, a front side of the said element having surfaces comprising a lower and an upper portion that join each other, said lower portion, from the junction with said upper portion, extending downwardly and rearwardly with respect to the direction of travel, said upper portion, from said junction, extending upwardly and rearwardly, said element being positioned to protect the front of said frame and the connections of said tines with their supports by fending off debris in and on the soil that would be encountered by the rotating tines during operation.

14. A cultivator having an elongated frame and a plurality of rotatable soil working members arranged in a transverse row, said soil working members being rotatable about upwardly extending axes and comprising downwardly extending tines mounted on supports, said supports with tines being in driving connection and rotated by driving means, screening means connected to said cultivator and extending substantially horizontally along the front of said frame relative to the direction of travel, a lower portion of said screening means being positioned directly in front of the connections of said tines to their respective supports during operation, said screening means being linked to said cultivator frame and said screening means comprising an elongated element that is displaceable in a forward direction with respect to said frame, a lower edge of said element being located immediately adjacent the connection of said tines with their respective supports during rotation thereof, said screening element being substantially L-shaped in cross-section with two connected limbs, a lower limb of said element extending downwardly and rearwardly with respect to the direction of travel from a junction between said two limbs, and upper limb extending upwardly and rearwardly from said junction, said element being moved along and through the ground and being positioned to protect the front of said frame and the connections of said tines with their supports from debris in and on the soil during operation.

15. A cultivator having an elongated frame and a plurality of rotatable soil working members arranged in a transverse row, said soil working members being rotatable about upwardly extending axes and comprising downwardly extending tines mounted on supports, said supports with tines being in driving connection and rotated by driving means, screening means connected to said cultivator and extending substantially horizontally along the front of said frame relative to the direction of travel, said screening means comprising an elongated element that is displaceable in an upward direction with respect to said frame, adjustment means interconnecting said frame with said element and the latter being normally located in an operative protective position in front of said tines and their connections to said supports, a front side of said element having a surface that engages the soil during travel and comprises a lower portion that extends downwardly and rearwardly, said lower portion terminating substantially above said working portion of said tines to protect the front of said frame and the connections of said tines with their supports from debris in and on the soil that would be encountered by the cultivator during operation.

* * * * *